United States Patent
Sistla et al.

(10) Patent No.: US 7,590,805 B2
(45) Date of Patent: Sep. 15, 2009

(54) MONITOR IMPLEMENTATION IN A MULTICORE PROCESSOR WITH INCLUSIVE LLC

(75) Inventors: Krishnakanth V. Sistla, Hillsboro, OR (US); Bryan L. Spry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 11/323,368

(22) Filed: Dec. 29, 2005

(65) Prior Publication Data

US 2007/0156971 A1 Jul. 5, 2007

(51) Int. Cl.
*G06F 13/00* (2006.01)
(52) U.S. Cl. .................. 711/146; 711/141; 711/147
(58) Field of Classification Search .................. None
See application file for complete search history.

(56) References Cited

U.S. PATENT DOCUMENTS 6,073,210 A * 6/2000 Palanca et al. ............. 711/118
6,321,303 B1 * 11/2001 Hoy et al. .................. 711/140
6,321,307 B1 * 11/2001 Maguire et al. ............ 711/146
6,668,309 B2 * 12/2003 Bachand et al. ............ 711/146
2004/0260880 A1 * 12/2004 Shannon et al. ........... 711/122

OTHER PUBLICATIONS

Zhong-Ning Cai et al., U.S. Appl. No. 11/173,917, entitled "Cache Coherency Sequencing Implementation and Adaptive LLC Access Priority Control for CMP," filed Jun. 30, 2005.

* cited by examiner

*Primary Examiner*—Hong Kim
*Assistant Examiner*—Thanh D Vo
(74) *Attorney, Agent, or Firm*—Erik R. Nordstrom

(57) ABSTRACT

A method and apparatus to implement monitor primitives when a processor employs an inclusive shared last level cache. By the employing an inclusive last level cache, the processor is almost always able to complete a monitor transaction without requiring self snooping through the system interconnect.

12 Claims, 5 Drawing Sheets

MONITOR IMPLEMENTATION IN A MULTICORE PROCESSOR WITH INCLUSIVE LLC

BACKGROUND INFORMATION

Multi-core processors, often called Chip Multiprocessors (CMPs), contain multiple processor cores which, in some embodiments may be connected to an on-die shared cache though a shared cache scheduler and coherence controller. Multi-core multi-processor systems are becoming increasingly common in commercial server systems because of their performance, scalability and modular design. The coherence controller and the shared cache may either be centralized or distributed among the cores. The shared cache may be designed as an inclusive cache to provide snoop filtering.

These multi-core multi-processor systems results in a system with a large number of concurrent threads executing in parallel. To enable a high performance parallel execution environment, an efficient implementation of thread synchronization primitives is needed. In particular, a need exists to implement monitor primitives when the processor employs an inclusive shared last level cache.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

The following description describes techniques for improved monitor implementation in a multi-core processor with an inclusive LLC. In the following description, numerous specific details such as logic implementations, software module allocation, bus and other interface signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In certain embodiments the invention is disclosed in the form of caching bridges present in implementations of multi-core Pentium® compatible processor such as those produced by Intel® (Corporation. However, the invention may be practiced in the cache-coherency schemes present in other kinds of multi-core processors, such as an Itanium® Processor Family compatible processor or an X-Scale® family compatible processor.

Figure 1A:
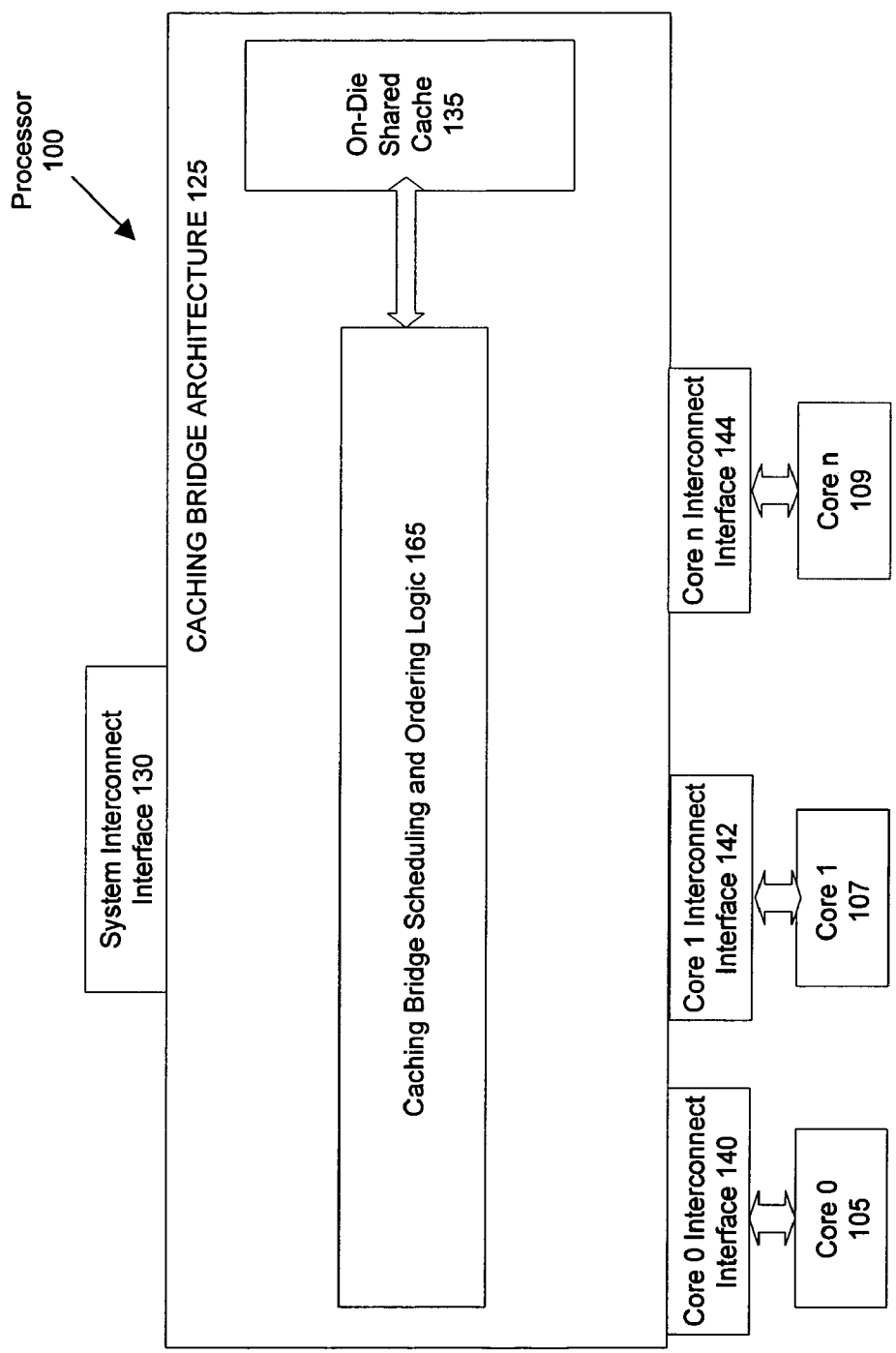
FIG. 1a is a block diagram of a multiple CMP system with a caching bridge, according to one embodiment.

Referring now to FIG. 1a, a block diagram of a processor 100 including a bridge and multiple cores is shown, according to one embodiment. Processor 100 may have N processor cores, with core 0 105, core 1 107, and core n 109 shown. Here N may be any number. Each core may be connected to a bridge as shown using interconnections, with core 0 interconnect interface 140, core 1 interconnect interface 142, and core n interconnect interface 144 shown. In one embodiment, each core interconnect interface may be a standard front-side bus (FSB) with only two agents, the bridge and the respective core, implemented. In other embodiments, other forms of interconnect interface could be used such as dedicated point-to-point interfaces.

A centralized LLC may also be known as a caching bridge 125 or global order (GO) architecture. Caching bridge 125 may connect with the processor cores as discussed above, but may also connect with system components external to processor 100 via a system interconnect interface 130. In one embodiment the system interconnect interface 130 may be a FSB. However, in other embodiments the system interconnect interface 130 may be a dedicated point-to-point interface.

Processor 100 may in one embodiment include an on-die shared cache 135. This cache may be a last-level cache (LLC), the LLC is the cache in processor 100 closest to system memory (not shown) accessed via system interconnect interface 130. In other embodiments, the cache shown attached to a bridge may be of another order in a cache-coherency scheme.

Scheduler 165 may be responsible for the cache-coherency of the LLC 135. When one of the cores, such as core 0 105, requests a particular cache line, it may issue a core request up to the scheduler 165 of bridge 125. The scheduler 165 may then issue a cross-snoop when needed to one or more of the other cores, such as core 1 107. In some embodiments the cross-snoops may have to be issued to all other cores. In some embodiments, they may implement portions of a directory-based coherency scheme (e.g. core bits). The scheduler 165 may know which of the cores have a particular cache line in their caches. In these cases, the scheduler 165 may need only send a cross-snoop to the indicated core or cores.

Figure 1B:
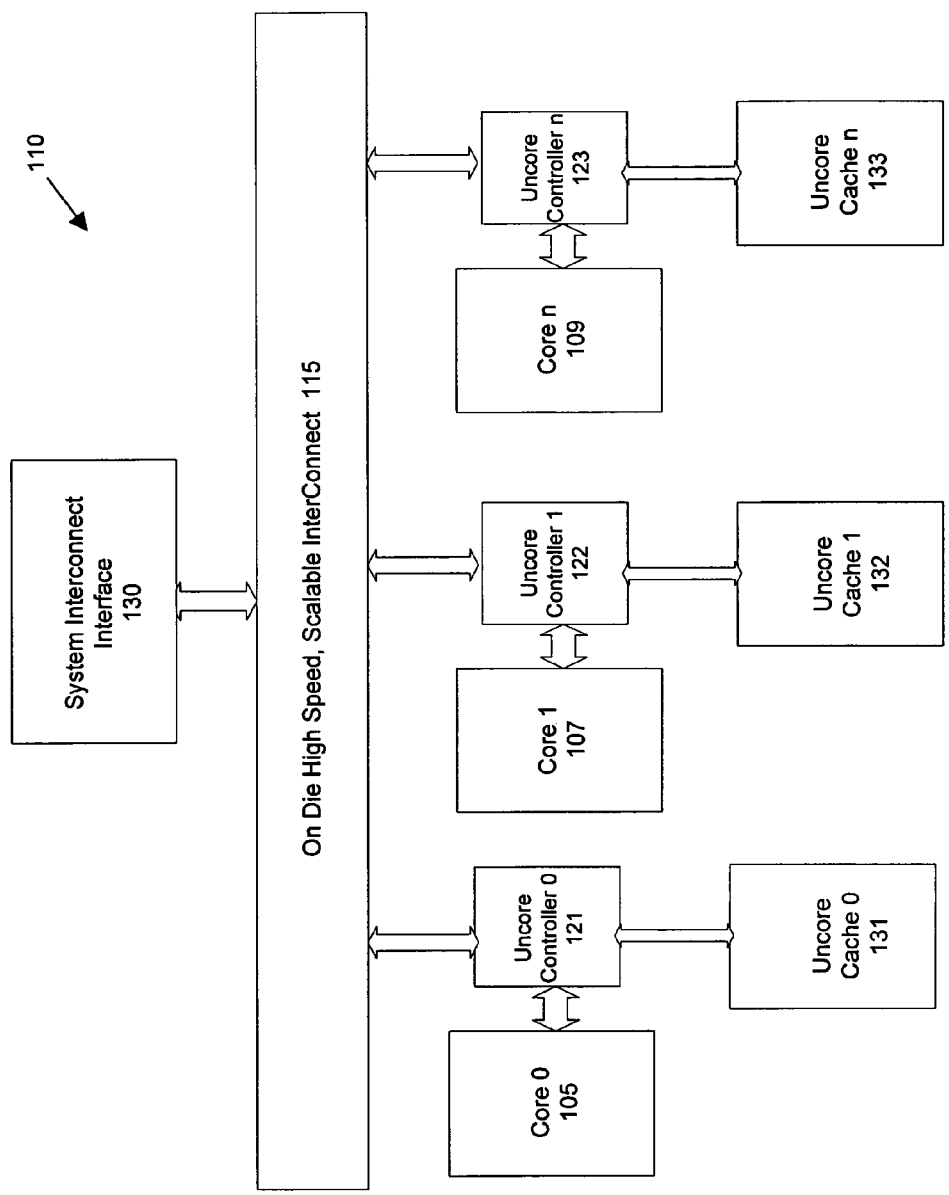
FIG. 1b is a block diagram of a distributed shared cache, according to one embodiment.

Referring now to FIG. 1b, a diagram of a processor with a distributed shared cache, according to one embodiment. In this processor 110, the shared cache and coherency control logic is distributed among the multiple cores. In particular, each core 105, 107, 109 is connected to the other uncore caches 131, 132, 133 through its uncore controllers 121, 122, 123. The cache is broken up into n components, but logically behaves as one single cache. Each core may access the other caches through the uncore controller and interconnect. It is immaterial how the caches are designed, as long as, there are multiple cores and the cache is an inclusive, unified coherence domain shared cache. By uncore, it means everything beyond the core interface. The eviction method described herein occurs in the uncore controller.

The scalable high speed on-die interconnect 115 may ensure that the distributed shared cache accesses have a low latency. There exists a latency and scalability tradeoff between both the configurations of FIGS. 1a and 1b. The caching bridge architecture of FIG. 1a may provide a low latency access to the shared cache when the number of cores is relatively small (2 to 4). As the number of cores increases, the bridge 165 may become a performance bottleneck. The distributed shared configuration of FIG. 1b may provide a scalable but relatively higher latency access to the shared cache 35.

Since multiprocessor systems are becoming popular in server systems because of their design, these multiprocessor systems may slow down the core pipelines by the large amount of snoop traffic on the system interconnect. The LLC is the largest member of the on die memory hierarchy and, in a CMP design, is generally shared by multiple cores on die. Many coherency protocol functions, such as coherency states and core bits, often are implemented in the LLC. Therefore, the LLC is usually the nexus for the CMP coherency protocol implementation. Generally, there are two types of LLC access requests in a CMP system. First are the on-die core LLC requests and second type are the snoop requests.

The one die core access the shared LLC to obtain the requested data as rapidly as possible. Any delay may directly affect core performance. The snoop requests may be either external snoops from other agents in the system or self-snoop requests from the same package or the cross snoop requests from the on die coherence controller.

In addition, individual processors in a processor often contain multiple cores to further improve the scalability and deliver higher per socket performance. This results in a system with a large number of concurrent threads executing in parallel. To enable a high performance parallel execution environment, an efficient implementation of thread synchronization primitives is needed. One such implementation is monitor architecture. Monitor architecture is used in current processors as a sleep/wake up mechanism.

The current proposed implementation provides an efficient method to implement monitor primitive when the processor employs an inclusive shared last level cache. Advantageously, this implementation reduces the time taken for setting up and releasing the monitor by taking advantage of the inclusive nature of the LLC. Thereby reducing the synchronization overhead between threads.

Transaction processing requires multiprocessor systems which may execute large number of relatively independent threads. Monitor architecture is one of several mechanisms used for thread level synchronization in a multithreaded software environment. Monitor architecture consists of two primitives. First one is used for setting up the monitor and second one is used for putting the thread to sleep, waiting for the wake up. For purposes of this application, the first procedure will be known as monitor_setup and the second procedure will be known as monitor_wait.

Figure 2:
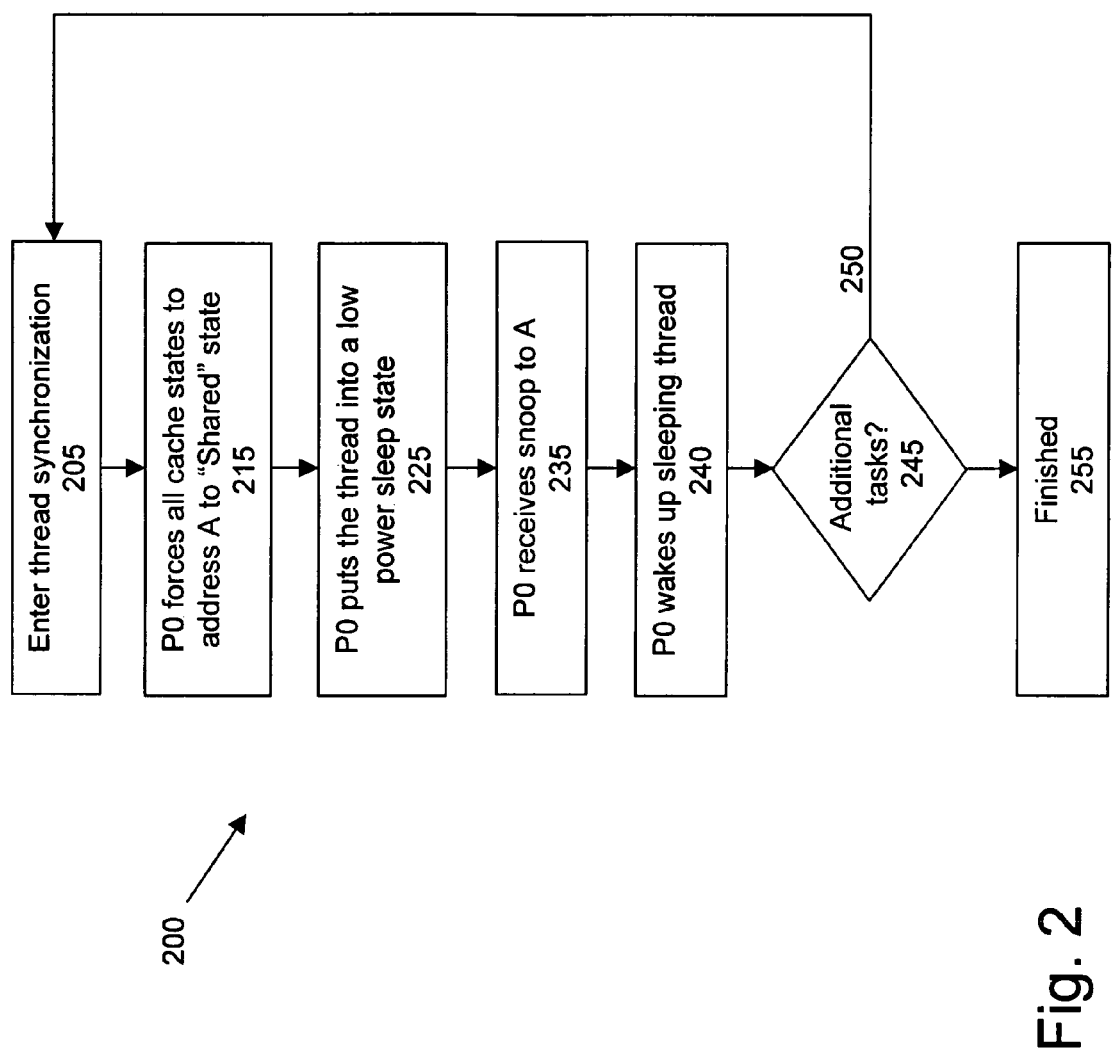
FIG. 2 is a flowchart of monitor based thread synchronization flow, according to one example method.

Referring now to FIG. 2, illustrating a monitor thread synchronization flow 200. In the usage flow 200, there are a large number of threads executing from a pool of tasks. As threads complete their assigned tasks, they use the monitor based synchronization to pick up a new task from the operating system scheduler, block 205. When a currently executing thread completes the task assigned to it, it first executes a monitor_setup procedure on address A, 210. The address is pre-determined and agreed to between the communicating threads. When the processor detects a monitor_setup, it makes an entry into its local monitor table with the address A and the thread id of the monitor issuing thread. In addition, it issues a data read transaction to address A. Data read to A is tagged with a monitor bit to indicate to other components that this data read is a monitor transaction. Data read to A will ensure that all other processors in the system demote the state of their cache line to "shared" or "invalid", block 215. This is done to ensure that a snoop is caused by the waking threads store.

If the processor is an IA-32 processor, the issuing processors cache may contain the line in E or M state. For these instances, the processor issuing monitor will perform a self snoop of its own cache hierarchy. This self snoop will ensure that any pending E or M state for address A in the issuing processors cache is demoted to "shared" or "invalid".

Once monitor_setup completes, the issuing thread will issue a monitor_wait procedure 220. This procedure will notify the processor that this thread intends to sleep and is willing to relinquish processor resources, block 225. After some time, the waking thread issues a store to address A, 230. The store to address A causes a "read for ownership" transaction on the system interconnect 130 which in turn causes a snoop to address A to the monitoring processor, block 235. When the monitoring processor receives a snoop, it will search through its monitor table to match address A. When the monitoring processor finds a match it will wake the thread which is currently sleeping on the matching monitor 240. If additional tasks remain, block 245, then reenter monitor flow 250, else, finished 255.

FIG. 2, for illustration purposes, describes the monitor architecture using the task assignment usage. It should be noted that monitor architecture may be used for a variety of inter-processor communication models. The time taken for completing the monitor_setup procedure is determined by the time it takes to complete the data read transaction. This time is increased by the necessity in current processor architectures to perform self snoop to clean its own caches. However, by reducing the time it takes to complete the monitor_setup the present invention may improve the performance of thread synchronization. This may be accomplished by taking advantage of the inclusive nature of the LLC. Whereby the self snoop required to establish monitor may be eliminated in most instances and thus reducing the time required to set up the monitor.

The present invention is described using the caching bridge architecture implementation of LLC. However, it may equally applicable to a distributed shared cache implementation of LLC. The monitor setup procedure described above is to ensure that all processors in the system have demoted the coherence state of the monitored address to either "shared" or "invalid".

The presence of an inclusive LLC architecture as shown in FIGS. 1a and 1b, in many cases the highest cache state of the issuing core and possibly other cores in the system may be determined reliably without performing the self snoop. By taking advantage of this information the system may significantly reduce the number of instances it requires a self snoop of the issuing processor. Self snoop may be expensive both in terms of latency and bandwidth utilization on the system interconnects. As the number of cores connecting to the same last level shared cache increases, the performance of the monitor implementation improves with improvement in sharing.

There are three time windows of primary importance where a request may access the LLC cache. These three time windows are a cache lookup, a cache fill, and an external or self snoop. All actions needed in the three time windows mentioned above are controlled by the caching bridge control logic. Each request that goes into the caching bridge may result in at least one or two of the actions mentioned above during its life in the caching bridge. The action carried out depends on the type of request and the current LLC state.

Referring now to the three time windows listed above, a cache lookup occurs when a core issues a cacheable read (or read for ownership) request to the caching bridge. A cache lookup may result from several actions. If the cache lookup determines that the LLC cache holds the requested cache line at an appropriate state then the LLC access request may be satisfied with the data held by the LLC. If the LLC cache holds the requested cache line but another core or cores in the processor has cache line ownership rights that prevent completion of the request, the caching bridge logic may snoop the other core(s) to induce those core to yield ownership rights to the requesting core.

This snooping operation may be performed on the die, thus reducing the overhead of using the system interconnect for this operation. If the LLC cache does not hold the requested line with sufficient privilege (a "cache miss"), a system interconnect request to obtain the line may be made.

A cache fill occurs as a result of a core write request or as a result of the system interconnect returning data in response to a system interconnect request that resulted from a cache miss.

Figure 3:
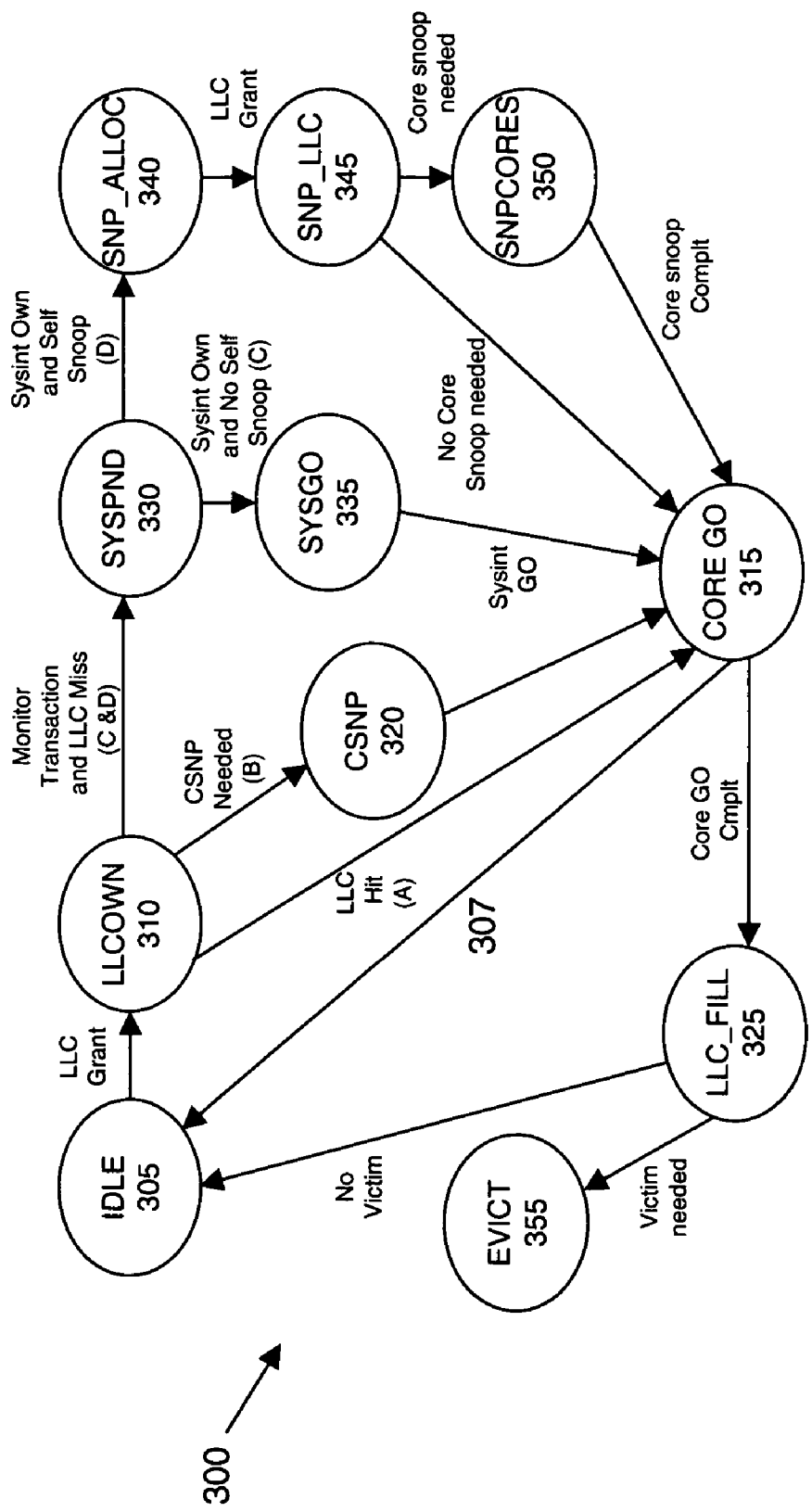
FIG. 3 is a logic state diagram of a monitor implementation utilizing an inclusive last level cache, according to one embodiment.

Referring now to FIG. 3, an embodiment of a monitor transaction implementation for a multicore inclusive LLC 300 is shown. In caching bridge architecture when a core in the processor issues a monitor transaction, it is allocated in the outgoing transaction queue in the caching bridge and waits for grant from the LLC arbiter. This transaction may be a BRLD (Bus Read Line Data) transaction with the monitor bit set and the self-snoop bit set. Self snoop bit and monitor bit are set to indicate to the caching bridge that special processing is required for this transaction. The self snoop bit indicates to the caching bridge that a self snoop of the issuing core may be required for this transaction. By using the inclusive LLC results, the number of transactions which require self snoop through the system interconnect may be significantly reduced.

Referring now to FIG. 3, the state diagram illustrates how the monitor implementation utilizes the inclusive LLC. During IDLE state 305, when a monitor transaction is detected, it is scheduled to lookup the LLC as any other transaction. When a LLC Grant is received from the LLC arbiter, the transaction enters the LLCOWN state 310. On completing the LLC lookup, based on the coherent state in LLC and the core bits in the LLC, several paths may be determined by the system. For example, if the core bits indicate that the monitor issuing cores core bits are set to zero, the system may be assured that the issuing core does not contain the cache line. This implies that self snoop is not required to be sent to the issuing core.

Similarly if the BRLD monitor transaction is a hit in the LLC, the core bits are set for the issuing core, and the LLC cache state is "shared", then there is no need to issue snoops to any agents in the system or a self-snoop to the requesting core. In this case, the monitor transaction may be completed immediately.

Table 1, below, illustrates the various possibilities on whether the system may complete the monitor transaction immediately or whether a cross snoop is required or whether a snoop on the system interconnect is required. In particular, Table 1 illustrates the various paths that may be taken in the caching bridge controller based on LLC coherency state and core bits with respect to the monitor issuing core. There are four different paths that a monitor setup transaction may take through the caching bridge (labeled A, B, C, and D). The present invention enables the system to make a more intelligent choice, as opposed to always sending a self-snoop to the system interconnects.

TABLE 1

| Path Identifier | State Flow |
|---|---|
| A | LLCOWN->CORE_GO |
| B | LLCOWN->CSNP->CORE_GO |
| C | LLCOWN->SYSPND->SYSGO->CORE_GO |
| D | LLCOWN->SYSPND->SNP_ALLOC->SNP_LLC-> SNPCORE->SYSGO->CORE_GO |

The shortest path, labeled A, in Table 1 may be taken when the LLC coherence state is enough to complete the transaction without any further action. To ensure that requesting core does not fill the line more than the S state, a LLC HIT signal is indicated to the requesting core. On issuing the LLC HIT signal, the state transitions to Core GO (global observation) state 315 and then transitions immediately back 307 to IDLE state 305. No snoop ever occurs in the core and the transaction never wakes during path A. Thus no FILL 325 needs to occur.

In case of path B, the coherence state is sufficient enough not to require a self snoop or a transaction to the system interconnect. However a cross snoop transaction is required to ensure that other cores in the processor are demoted to "S" state or lower. Upon issuing a cross snoop needed signal the state transitions to CSNP 320. The data and/or state may now be returned back to the issuing core and the state transitions to CORE GO 315. The state next transitions to LLC FILL 325 upon returning the data to the issuing core. Since the monitor was in the correct state and not woken up, the state now transitions from LLC FILL 325 to IDLE 305. During path B, there is no need for the monitor to be woken up as in path A.

In the case of path C or D, the coherence state is insufficient to determine the cache state in other processors. The line is not in the cache and none of the cores have the requested line. Here, the transaction transitions to state SYSPND 330 and issues to the system interconnect. Now, the system decides to do a self snoop or no self snoop. The decision to do a self snoop is based on various parameters. Such as the type of request, what state the hit occurred in the LLC (here it is LLC MISS), and the transaction type to name a few of the parameters.

For path C, as stated above, the coherence state is insufficient to determine the cache state in other processors. However, once on the system interconnect, it may be determined that the issuing core does not contain the cache line. The transaction transitions to state SYSGO 335. The transaction is issued to the system without requiring a self snoop to the issuing processor and transitions to CORE GO 315.

For the longest path D, as stated above, the coherence state is insufficient to determine the cache state in other processors. In addition, the coherence indicates the issuing core may possibly contain the line in either "E" or "M" state. In order to demote the coherence state to less than "S" and ensure that LLC state is also demoted to "S" or below, a self snoop is issued to the LLC as well. To accomplish this, the transaction transitions to SNP_ALLOC 340 to allocate snoop for the transaction. State SNP_ALLOC 340 then allocates a LLC Grant when the system looks up the cache with the snoop. Once allocated, the system self snoop at state SNP_LLC 345. At state SNP_LLC 345, the system is looking at the tags and everything in the cache. Based on the results obtained, the system either snoops the cores or not.

The system snoops the cores if cache lines are present at state SNPCORES 350. Once the cores are snooped, the snoop wakes up the core monitor. The system now has to go through another cycle to put the monitor back to sleep.

The system does not snoop the core if no cache lines are present in the cores. Thus no snoop is needed and the state transitions to CORE Go 315. At Core GO 315, the snoop has completed.

Table 2 below, illustrates various coherence states in LLC, core bit combinations and the resulting actions take by the caching bridge. As can be seen from Table 2, there are only two instances where path D is used. In most instances path A may be used. In just two instances each path B and C are used.

The current proposed implementation provides an efficient method to implement monitor primitive when the processor employs an inclusive shared last level cache. Advantageously, this implementation reduces the time taken for setting up and releasing the monitor by taking advantage of the inclusive nature of the LLC. Thereby reducing the synchronization overhead between threads.

Figure 4:
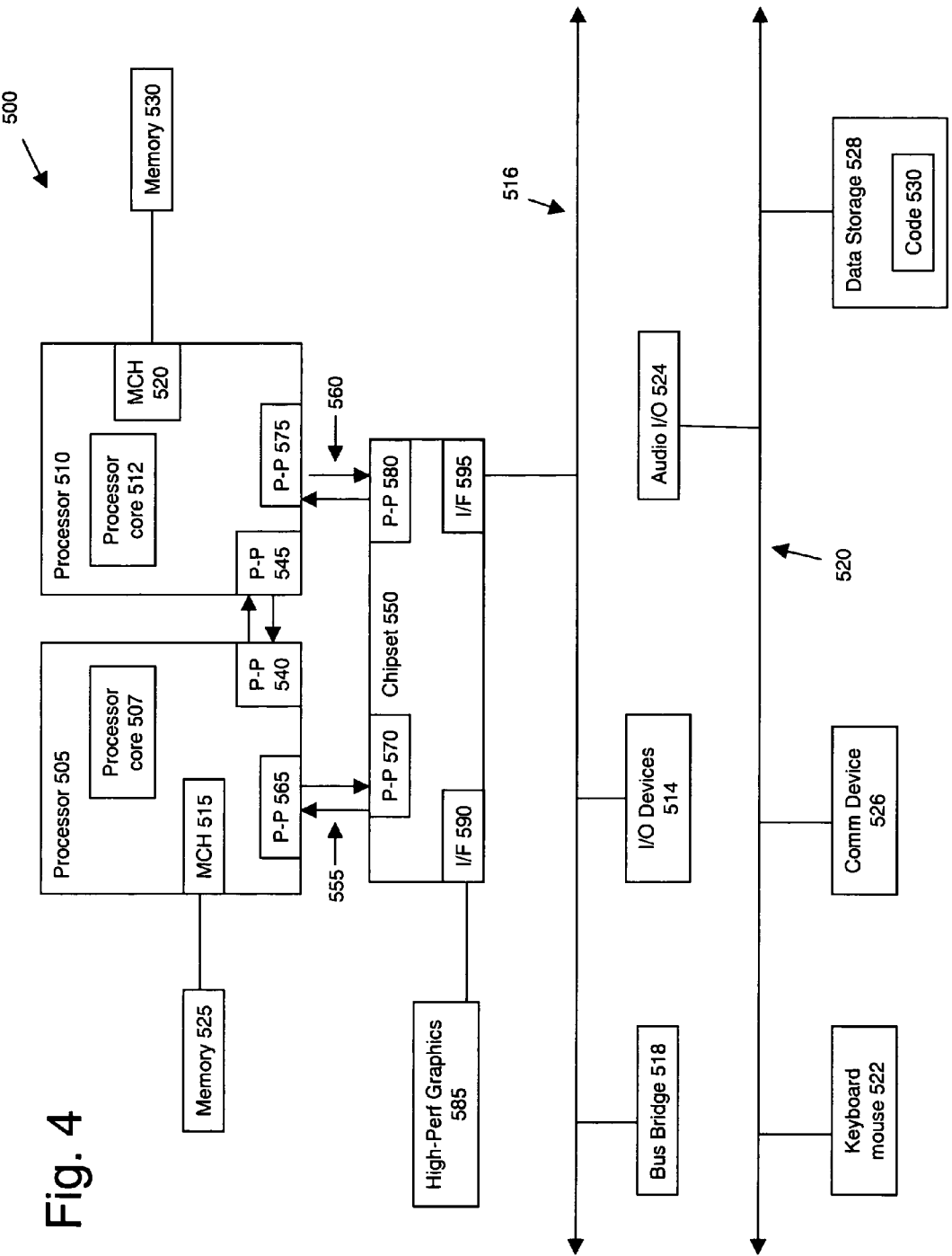
FIG. 4 is a block diagram of an alternative system that may provide an environment for multithreaded processors supporting monitor implementation.

Referring now to FIG. 4, the system 500 generally shows a system where processors, memory, and input/output devices are interconnected by a number of point-to-point interfaces. The system 500 may also include several processors, of which only two, processors 505, 510 are shown for clarity. Each processor 505, 510 may each include a processor core 507, 512, respectively. Processors 505, 510 may each include a local memory controller hub (MCH) 515, 520 to connect with

TABLE 2

| LLC State | Core Bits | Self Snoop Needed | Cross Snoop Needed | SysInt Needed | Indication to the core | Completion Path Index | Next State after LLCOWN |
|---|---|---|---|---|---|---|---|
| I  | None  | No  | No  | No  | Defer | C | SYSPND |
| S  | None  | No  | No  | No  | Complete with HIT | A | CORE_GO |
| S  | Same  | No  | No  | No  | Complete with HIT | A | CORE_GO |
| S  | Other | No  | No  | No  | Complete with HIT | A | CORE_GO |
| S  | All   | No  | No  | No  | Complete with HIT | A | CORE_GO |
| E  | None  | No  | No  | Yes | Defer | C | SYSPND |
| E  | Same  | Yes | No  | Yes | Defer | D | SYSPND |
| E  | Other | No  | Yes | No  | Defer | B | CSNP |
| M  | None  | No  | No  | No  | Complete with HIT | A | CORE_GO |
| M  | Other | No  | Yes | No  | Complete with HIT | B | CSNP |
| M  | Same  | Yes | No  | Yes | Defer | D | SYSPND |
| ES | None  | No  | No  | No  | Complete with HIT | A | CORE_GO |
| ES | Same  | No  | No  | No  | Complete with HIT | A | CORE_GO |
| ES | Other | No  | No  | No  | Complete with HIT | A | CORE_GO |
| ES | All   | No  | No  | No  | Complete with HIT | A | CORE_GO |
| MS | None  | No  | No  | No  | Complete with HIT | A | CORE_GO |
| MS | Same  | No  | No  | No  | Complete with HIT | A | CORE_GO |
| MS | Other | No  | Yes | No  | Defer | B | CSNP |
| MS | All   | No  | No  | No  | Complete with HIT | A | CORE_GO |
| MI | None  | No  | No  | No  | Complete with HIT | A | CORE_GO |

All four paths, A, B, C and D, end up in a common state CORE_GO 315 once the monitor set up is completed. While in CORE_GO 315 state a global observation indication is sent to the requesting state as a defer reply with a HIT response. The transaction went out to memory with a read and now it has to fill into the LLC at state LLC FILL 325. In order to maintain inclusivity, the caching bridge may FILL 325 the same line into LLC. This is important since an incoming waking snoop may determine without ambiguity as to which core is monitoring (i.e. contains the line in S state).

Next, the system needs to determine if there was a victim or not. When the system looks up the cache, it does the fill. Upon completing the fill, the system may return a state EVICT 355 that notifies the system whether the cache had room or not. This line is the victim and thus evicted.

memory 525, 530. Processors 505, 510 may exchange data via a point-to-point interface 535 using point-to-point interface circuits 540, 545. Processors 505, 510 may each exchange data with a chipset 550 via individual point-to-point interfaces 555, 760 using point to point interface circuits 565, 570, 575, 580. Chipset 550 may also exchange data with a high-performance graphics circuit 585 via a high-performance graphics interface 590.

The chipset 550 may exchange data with a bus 516 via a bus interface 595. In either system, there may be various input/output I/O devices 514 on the bus 516, including in some embodiments low performance graphics controllers, video controllers, and networking controllers. Another bus bridge 518 may in some embodiments be used to permit data exchanges between bus 516 and bus 520. Bus 520 may in some embodiments be a small computer system interface (SCSI) bus, an integrated drive electronics (IDE) bus, or a universal serial bus (USB) bus. Additional I/O devices may be connected with bus 520. These may include keyboard and cursor control devices 522, including mouse, audio I/O 524, communications devices 526, including modems and network interfaces, and data storage devices 528. Software code 530 may be stored on data storage device 528. In some embodiments, data storage device 528 may be a fixed magnetic disk, a floppy disk drive, an optical disk drive, a magneto-optical disk drive, a magnetic tape, or non-volatile memory including flash memory.

Advantageously, the present invention presents improvement in the field of multicore processors with inclusive last level caches. By taking advantage of the properties of an inclusive cache, monitor setup transaction are increased. As opposed to always requiring an expensive operation, such as self snoop of the issuing processor through the system interconnect, the present approach may always complete the monitor transaction on a LLC hit. Previously, monitor setup would take up to 100 ns. Using the present approach, most applications would complete in less than 20 ns. This is almost a 5× improvement in monitor setup latencies. Furthermore, by using the inclusive LLC results, the number of transactions which require self snoop through system interconnect may be significantly reduced.

What is claimed is:

1. A method comprising:
   issuing, for a requesting core in a multi-core system having a shared cache, a monitor transaction;
   detecting the monitor transaction;
   determining bit status in the shared cache for the request core including detecting a coherence state for the shared cache and a core bit status of an issuing core for the requesting core;
   completing the monitor transaction without sending a self-snoop to the requesting core based on the core bit status of the issuing core, and receiving a last level cache (LLC) grant signal.

2. The method of claim 1, further comprising receiving a LLC HIT signal.

3. The method of claim 2 wherein the LLC HIT signal indicates the coherency state.

4. The method of claim 1, wherein completing the monitor transaction comprises sending out a global observation signal to requesting core.

5. The method of claim 1, further comprising issuing a cross snoop transaction.

6. The method of claim 5 wherein issuing a cross snoop transaction includes ensuring other cores are not prohibiting access to the shared cache.

7. The method of claim 1, further comprising determining if the requesting core does not contain cache line.

8. A system comprising:
   a bridge; and
   one or more cores coupled to the bridge, the bridge including a shared cache and control logic, wherein the bridge is to detect a monitor transaction, determine bit status in the shared cache for the requesting core including detecting a coherency state for the shared cache and a core bit status of an issuing core for a requesting core, completing the monitor transaction without sending a self-snoop to the requesting core based on the core bit status of the issuing core, and receiving a last level cache (LLC) grant signal.

9. The system of claim 8 wherein the bridge indicates a last level cache (LLC) HIT signal to indicate the coherency state.

10. The system of claim 8, wherein the bridge is to send out a global observation signal to the issuing core.

11. The system of claim 8, wherein the bridge issues a cross snoop transaction to indicate the coherency state.

12. The system of claim 8, wherein the bridge is to determine if the issuing core does not contain cache line.

\* \* \* \* \*

UNITED STATES PATENT AND TRADEMARK OFFICE
CERTIFICATE OF CORRECTION

PATENT NO. : 7,590,805 B2
APPLICATION NO. : 11/323368
DATED : September 15, 2009
INVENTOR(S) : Sistla et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 192 days.

Signed and Sealed this

Twenty-first Day of September, 2010

David J. Kappos
*Director of the United States Patent and Trademark Office*